United States Patent [19]

Ishida et al.

[11] Patent Number: 5,050,557

[45] Date of Patent: Sep. 24, 1991

[54] STRATIFIED-COMBUSTION INTERNAL COMBUSTION ENGINE

[75] Inventors: Tetsuro Ishida; Yoshiaki Danno, both of Kyoto; Hiromitsu Ando, Okazaki, all of Japan

[73] Assignee: Mitsubishi Jidosha Kogyo Kabushiki Kaisha, Tokyo, Japan

[21] Appl. No.: 500,761

[22] Filed: Mar. 28, 1990

[30] Foreign Application Priority Data

Mar. 31, 1989 [JP] Japan .................................. 1-81015
Mar. 1, 1990 [JP] Japan .................................. 2-50474

[51] Int. Cl.⁵ .............................................. F02B 15/00
[52] U.S. Cl. ...................................... 123/432; 123/308
[58] Field of Search .................................. 123/432, 308

[56] References Cited

U.S. PATENT DOCUMENTS

| | | | |
|---|---|---|---|
| 3,318,292 | 5/1967 | Hideg | 123/52 M |
| 4,246,874 | 1/1981 | Nakagawa et al. | 123/432 |
| 4,494,504 | 1/1985 | Yagi et al. | 123/308 |
| 4,548,175 | 10/1985 | Kawai et al. | 123/308 |
| 4,766,866 | 8/1988 | Takii et al. | 123/432 |
| 4,779,594 | 10/1988 | Oda et al. | 123/432 |
| 4,841,935 | 6/1989 | Yamada et al. | 123/432 |
| 4,856,473 | 8/1989 | Kawai et al. | 123/308 |

FOREIGN PATENT DOCUMENTS

| | | |
|---|---|---|
| 3444356 | 6/1985 | Fed. Rep. of Germany . |
| 3713628 | 11/1987 | Fed. Rep. of Germany . |
| 3828742 | 8/1988 | Fed. Rep. of Germany . |
| 1449256 | 10/1965 | France . |
| 63-201313 | 8/1988 | Japan . |

Primary Examiner—E. Rollins Cross
Attorney, Agent, or Firm—Frishauf, Holtz, Goodman & Woodward

[57] ABSTRACT

A stratified-combustion internal combustion engine according to the present invention comprises at least two intake ports situated on one side of a combustion chamber, guide passages connected individually to the intake ports, a fuel injector disposed in one of the guide passages. Each guide passage has a straight region extending over a predetermined length from its corresponding intake port. Thus, an air-fuel mixture and air, guided by the respective straight regions of the guide passages to be supplied through their corresponding intake ports to the combustion chamber, flow along the axial direction of a cylinder bore, thereby forming barrel swirl flow separated in layers from each other.

15 Claims, 13 Drawing Sheets

STRATIFIED-COMBUSTION INTERNAL COMBUSTION ENGINE

BACKGROUND OF THE INVENTION

1. Field of the Invention

The present invention relates to a stratified-combustion internal combustion engine, in which an air-fuel mixture and air, for example, are individually supplied to a combustion chamber, and the air-fuel mixture is burned in the combustion chamber in a manner such that the air-fuel mixture and the air form a stratified swirl flow.

2. Description of the Related Art

According to stratified-combustion internal combustion engines of this type, a rich air-fuel mixture and air is supplied to a combustion chamber, and the air-fuel mixture is subjected to perfect combustion by igniting the rich air-fuel mixture. In these internal combustion engines, therefore, the air-fuel mixture can be burned even if the total air-fuel ratio of the mixture and the air is higher than the theoretical air-fuel ratio, that is, if the air-fuel mixture is lean as a whole. Accordingly, the fuel cost performance of the engine can be improved, harmful materials, for example CO, $NO_x$ etc., contained in the exhaust gas of the engine can be reduced, and the engine can be effectively prevented from knocking.

In the stratified-combustion internal combustion engines, the combustion of the air-fuel mixture in the combustion chamber is effected through the aforementioned unique procedure. Thus, the improvement of the internal combustion engines of this type is intended primarily to produce a rich air-fuel mixture in the vicinity of an ignition plug in the combustion chamber, and secondarily to activate the air-fuel mixture flow in the combustion chamber, that is, to increase the combustion speed after the ignition, thereby stabilizing the combustion and enhancing the efficiency of combustion.

Accordingly, the conventional stratified-combustion internal combustion engines use various means for producing a rich air-fuel mixture layer on the ignition-plug side, and an air layer, that is, a lean air-fuel mixture layer, on the piston side, in the combustion chamber of one cylinder. One such means will be described in connection with an internal combustion engine which has two intake ports on one side of the combustion chamber of each cylinder. In the engine of this type, the intake ports are connected to a common intake passage by means of branch passages, and a swirl control valve is disposed in the branch passage which connects with one of the intake ports. In a part load condition, that is, a operation condition in which the fuel cost performance is more important than the power of the engine, the swirl control valve closes the branch passage corresponding to the one intake port, so that air is first introduced into the combustion chamber through the other intake port only. As a result, a swirl flow of air turning around the axis of the cylinder is produced in the combustion chamber. In the second half of the intake stroke, thereafter, fuel is supplied to the combustion chamber. If the air and the air-fuel mixture are introduced into the combustion chamber of this manner, the air-fuel mixture in the combustion chamber can be divided into two layers, rich and lean, as mentioned before.

Since the aforementioned means requires the swirl control valve to be disposed in one of the branch passages, however, the construction of the internal combustion engine itself is complicated, and the intake air is obstructed by the swirl control valve itself in the operation condition that the swirl control valve is opened, that is, in the full opening throttle condition. Therefore, the power of the engine is decreased.

SUMMARY OF THE INVENTION

The object of the present invention is to provide a stratified-combustion internal combustion engine, capable of forming a rich air-fuel mixture layer and an air layer or a lean air-fuel mixture layer definitely divided in a combustion chamber, ensuring satisfactory combustion of the fuel in the combustion chamber, and optimally supplying the air-fuel mixtures to the combustion chamber.

The above object is achieved by a stratified-combustion internal combustion engine according to the present invention. The internal combustion engine comprises: cylinder means for defining a cylinder bore, the cylinder means including a piston fitted in the cylinder bore and defining a combustion chamber in conjunction with part of the cylinder bore, and at least two intake ports situated on one side of a cross-sectional region of the combustion chamber, with respect to a vertical plane containing the axis of the cylinder bore, and opening into the combustion chamber; intake means for introducing air through the intake ports into the combustion chamber, the intake means including guide passages connected individually to the intake ports, projections of the respective axes of the guide passages on a horizontal plane, parallel to the cross section of the combustion chamber, extending substantially at right angles to the vertical plane and parallel to each other, whereby the guide passages guide the flow of the air introduced through the intake ports into the combustion chamber so that the air forms a swirl flow running along the axial direction of the cylinder bore in the combustion chamber; and fuel injection means for producing an air-fuel mixture by injecting a fuel into the air flowing through at least one of the guide passages.

According to the stratified-combustion internal combustion engine described above, the guide passages are connected individually to the intake ports, so that the air introduced from the intake ports into the combustion chamber through the guide passages during an intake stroke forms the swirl flow or the so-called barrel swirl flow, running along the axis of the cylinder bore in the combustion chamber. Accordingly, if the air-fuel mixture is produced by injecting the fuel into the air flowing through the one guide passage by means of the fuel injection means, a barrel swirl flow of the rich air-fuel mixture and a barrel swirl flow of the air, i.e., a lean air-fuel mixture, can be simultaneously produced in a definitely divided manner in the combustion chamber. These barrel swirl flows can be produced by only guiding the air-fuel mixture and the air by means of a simple mechanism, that is, the guide passages. By first igniting the barrel swirl flow of the rich air-fuel mixture, therefore, the barrel swirl flow of the lean air-fuel mixture can be also satisfactorily burned, thus ensuring stratified combustion. Further, since the speed of barrel swirl flows is increased, the combustion of the fuel can be promoted. In consequence, the fuel can be burned with stability even if the total air-fuel ratio of the rich air-fuel mixture and the lean air-fuel mixture is higher than the theoretical air-fuel ratio.

In the internal combustion engine of the present invention, an igniter is located in the vicinity of the intake port or the opening through which the rich air-fuel mixture is supplied to the combustion chamber, in order to ignite the barrel swirl flow of the rich air-fuel mixture securely, as mentioned before.

In order to ensure the production of the barrel swirl flows of the air-fuel mixture and the air supplied through the intake ports to the combustion chamber, that region of each guide passage which extends over a predetermined length from each corresponding intake port is preferably made straight.

Preferably, the fuel injection means of the internal combustion engine of the present invention includes a fuel injector, whose injection nozzle is situated within the straight region of the guide passage so as to face the intake port or the opening.

Further, the fuel injection means may include not only one fuel injector disposed in one guide passage communicated with one intake port or the opening, but also fuel injectors disposed individually in the respective straight regions of the two guide passages. In the latter case, it is necessary only that only one of the fuel injectors be actuated when the internal combustion engine is operated with low load, and both the fuel injectors be actuated when the engine is operated with high load. Thus, when the engine is in high-load operation, the air-fuel mixtures are supplied in the form of barrel swirl flows through the two intake ports to the combustion chamber.

If air-fuel mixtures are supplied to the combustion chamber through both the intake ports during high-load operation of the internal combustion engine, the engine preferably comprises another igniter separate from the aforesaid one. In this case, the additional igniter may preferably be situated in the center of the cylinder bore or in the vicinity of the intake port through which the air-fuel mixture is supplied to the combustion chamber during the high-load operation. Unlike the additional fuel injector, moreover, the additional igniter may be actuated in the overall operation region of the internal combustion engine.

DETAILED DESCRIPTION

Figure 1:
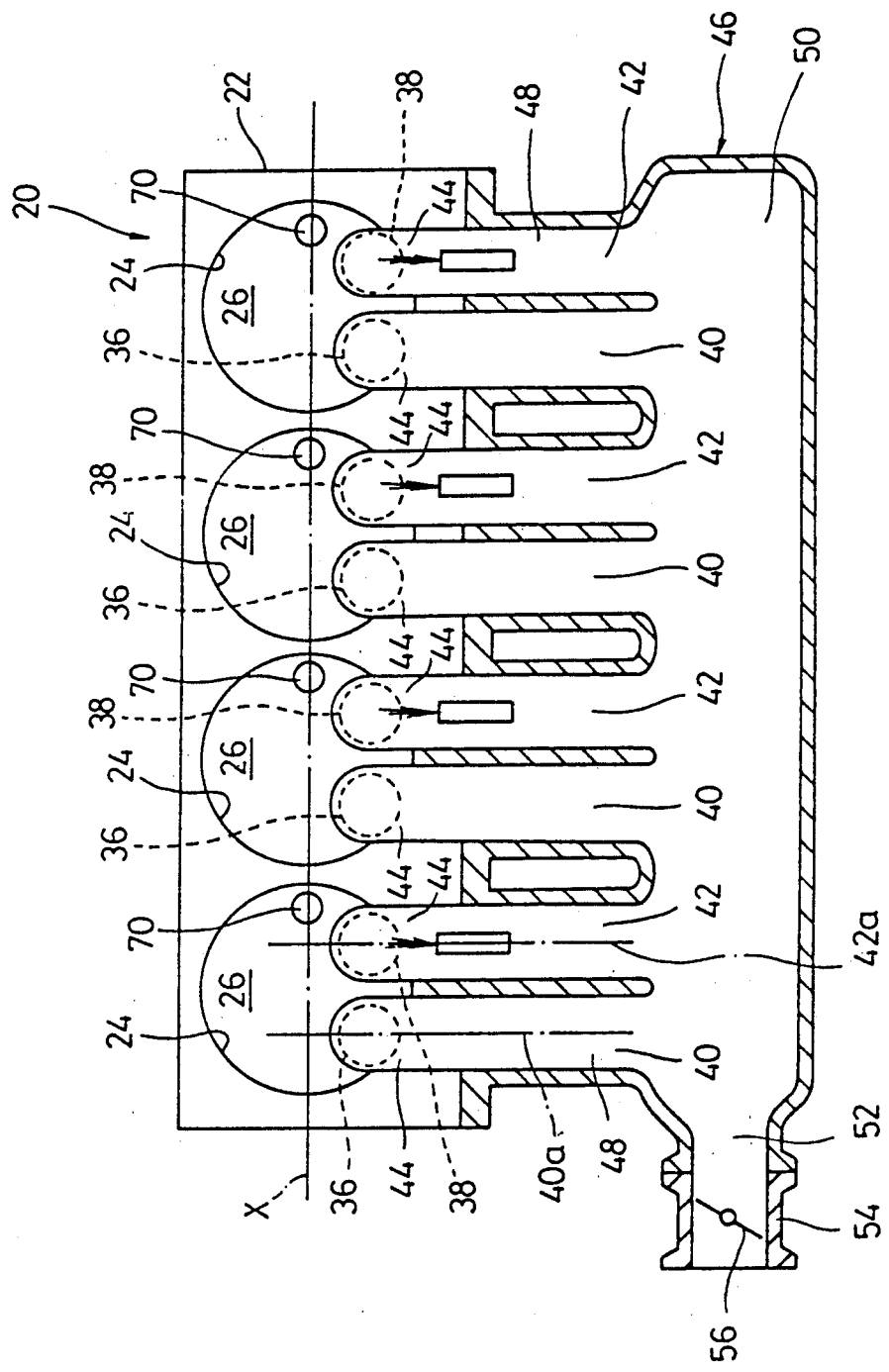
FIG. 1 is a schematic view, partially in section, showing a stratified-combustion internal combustion engine according to one embodiment of the present invention.

Referring now to FIG. 1, there is shown a stratified-combustion internal combustion engine 20, which is a straight-type 4-cylinder gasoline engine. Since the individual cylinders of the internal combustion engine 20 have the same construction, only one of them will be described below.

Each cylinder has a cylinder bore 24 formed in a cylinder block 22, and a piston 26 is fitted in the bore 24. As seen from FIG. 1, the respective cylinder bores 24 of the cylinders are arranged in a row.

Figure 2:
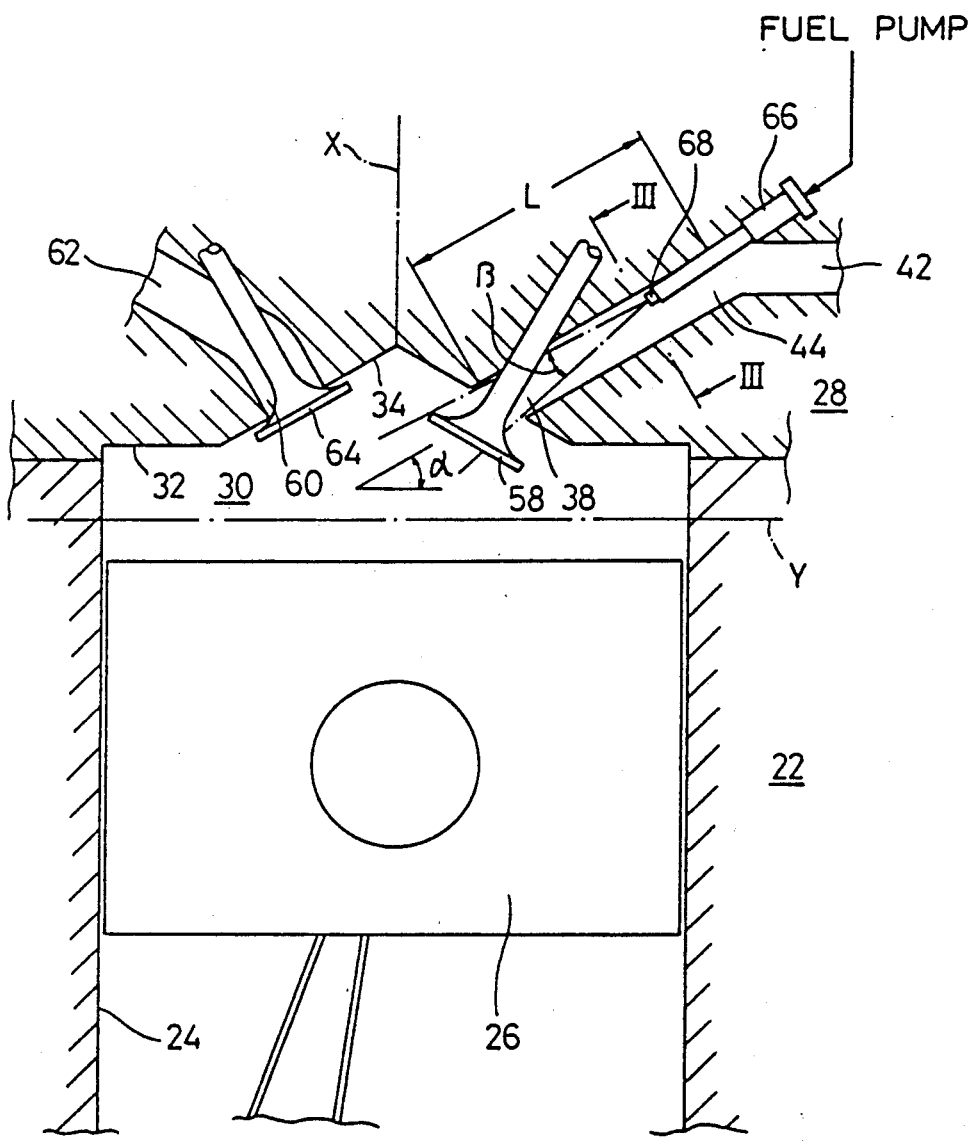
FIG. 2 is a sectional view showing one of cylinders of the internal combustion engine of FIG. 1.

As shown in FIG. 2, a cylinder head 28 is attached to the cylinder block 22 by means of a gasket (not shown), so that a combustion chamber 30 is defined between the piston 26 and the cylinder head 28, inside the cylinder bore 24.

The central portion of the inner wall surface of the cylinder head 28, which defines the combustion chamber 30, is formed as a so-called pentroof 34. The ridge of the pentroof 34 is situated on a vertical plane X (see FIG. 1) which contains the axis of each cylinder bore 24.

Two intake ports 36 and 38 individually open in one slope of the pentroof 34 of the combustion chamber 30. Thus, both these intake ports 36 and 38 are located on one side of the cross-sectional area of the cylinder bore 24, with respect to the vertical plane X, as shown in FIG. 1. The respective centers of the intake ports 36 and 38 are situated at equal distances from a plane which extends at right angles to the vertical plane X and contains the axis of the cylinder bore 24.

Guide passages 40 and 42 are connected to the intake ports 36 and 38, respectively. Each of these guide passages 40 and 42 includes an internal passage 44, formed in the cylinder head 28 and communicating with its corresponding intake port, and a branch line 48 of a intake manifold 46 connected to the passage 44. The intake manifold 46 includes a surge tank 50 to which the branch line 48 is connected. The surge tank 50 extends along the row of the respective cylinder bores 24 of the individual cylinders, that is, along the vertical plane X, as shown in FIG. 1. An inlet opening 52 is formed at one end portion of the surge tank 50. An intake pipe (not shown) is connected to the inlet opening 52 by means of a throttle body 54. A throttle valve 56, which is disposed in the throttle body 54, is operated by stepping on an accelerator pedal.

Further, a poppet-type intake valve 58 is disposed in each of the intake ports 36 and 38. Each intake valve 58 opens or closes its corresponding intake port by means of a mechanism not shown. In FIG. 2, only that intake valve 58 which is associated with the intake port 38 is shown in an open state.

An exhaust port 60 is formed in the other slope of the pentroof 34 of the combustion chamber 30, and an exhaust passage 62 is connected to the port 60. The exhaust port 60 is opened or closed by means of a poppet-type exhaust valve 64. Two exhaust valves may be used, in this case, they correspond to the intake valves in number.

The following is a detailed description of the guide passages 40 and 42. In FIG. 1, the guide passages 40 and 42 extend parallel to each other and at right angles to the vertical plane X. More specifically, if the respective axes of the guide passages 40 and 42 are projected on a horizontal plane Y (see FIG. 2) which extends at right angles to the vertical plane X and contains the cross section of the cylinder bore 24, axis projections 40a and 42a (see FIG. 1) of the passages 40 and 42 extend at right angles to the vertical plane X and parallel to each other.

As shown in FIG. 2, moreover, the guide passages 40 and 42 extend upward from their corresponding intake ports. At least the intake-port-side regions of the guide passages 40 and 42, i.e., those of the internal passages 44, extend straight for a predetermined length from their corresponding intake ports. Preferably, the length L of the straight region of each internal passage 44 is at least 1.1 times as long as the diameter of each intake port, for example. If the installation space for the internal combustion engine permits, the guide passages 40 and 42 are preferably formed straight throughout their length.

As shown in FIG. 2, moreover, the straight region of each internal passage 44 is inclined at a predetermined tilt angle $\alpha$ to the horizontal plane Y.

Figure 3:
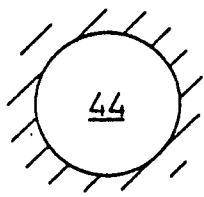
FIG. 3 is a sectional view taken along line III—III of FIG. 2.

Furthermore, the cross section of the straight region of the internal passage 44 of each guide passage is circular, as shown in FIG. 3, and its area is uniform along the axis of the straight portion.

A fuel injector 66 is disposed in one of the guide passages 40 and 42, e.g., the guide passage 42 on the right-hand side of FIG. 1 for the case of this embodiment. As shown in FIG. 2, the injector 66 is situated within the straight region of the internal passage 44 so that its injection nozzle 68 faces the intake port 38.

The fuel injector 66, which is connected to a fuel pump, is opened at a fuel injection period, so that the fuel is injected through the injection nozzle 68. The fuel injected through the injection nozzle 68 is fed in the shape of a cone into the intake port 38, that is, into the combustion chamber 30. As shown in FIG. 2, a fuel injection angle $\beta$ is limited to a predetermined angle or less. More specifically, the angle $\beta$ is set lest the fuel injected from the fuel injector 66 adhere to the inner wall of the internal passage 44.

Thus, if the fuel injector 66 is provided in the guide passage 42, as described above, an air-fuel mixture can be produced by injecting the fuel through the injector 66 into air which is supplied through the passage 42 to the combustion chamber 30.

An ignition plug 70 is attached to the cylinder head 28 so as to face the combustion chamber 30. As seen from FIG. 1, the plug 70 is situated close to the intake port 38. More specifically, the ignition plug 70 is located in the vicinity of the inner peripheral surface of the cylinder bore 24, on the vertical plane X and on the side of the intake port 38.

For the other cylinders, like reference numerals are used to designate like portions in FIG. 1, and a description of those portions is omitted.

The following is a description of the internal combustion engine described above. Since all the cylinders are operated in the same manner, the operation of one of the cylinders will be described below.

When one of the cylinders is in its intake stroke, the piston 26 is moved in a direction such that the capacity of the combustion chamber 30 increases, that is, downward as in FIG. 2. As the piston 26 descends in this manner, the air and the air-fuel mixture are introduced into the combustion chamber 30 through the intake ports 36 and 38, respectively, which are allowed to open by the intake valves 58. Since the fuel injector 66 is disposed in the one guide passage 42, according to this embodiment, the air-fuel mixture is supplied through the intake port 38 to the combustion chamber 30 by injecting the fuel from the injector 66 into the air flowing through the passage 42. On the hand, only the air is fed into the combustion chamber 30 through the intake port 36.

Figure 4:
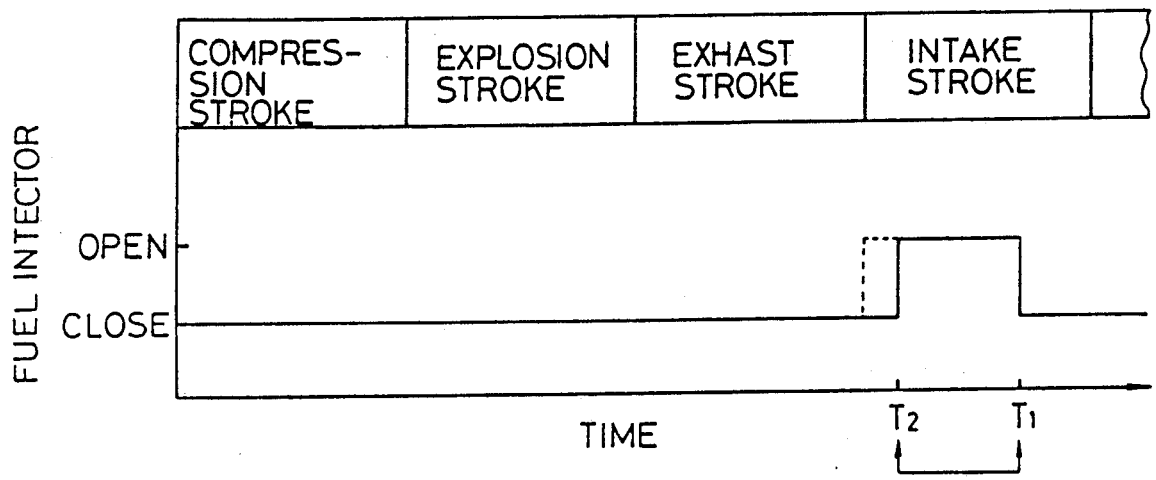
FIG. 4 is a diagram for illustrating the valve timing of a fuel injector.
Figure 5:
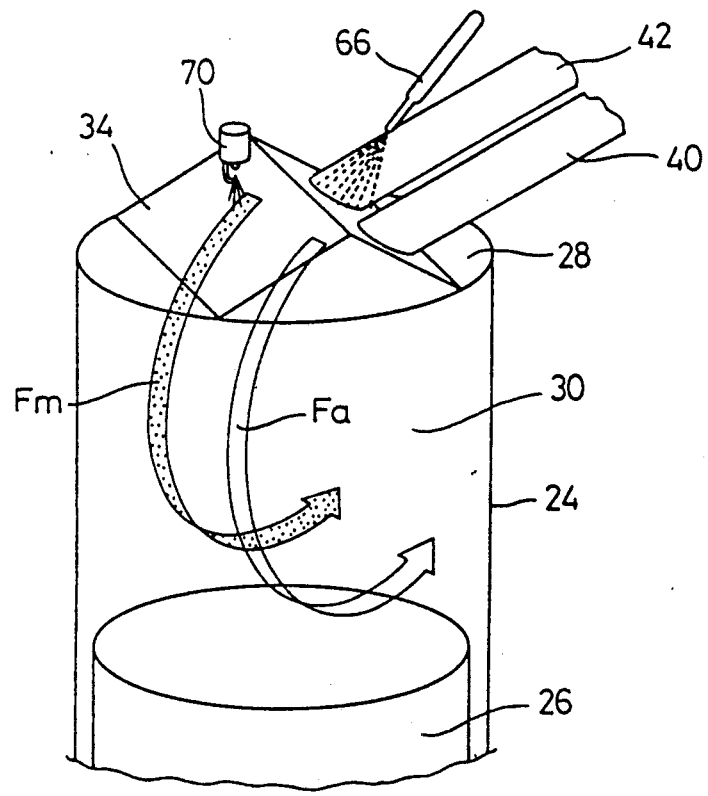
FIG. 5 is a perspective view schematically showing the cylinder of FIG. 2.

The period of the fuel injection from the fuel injector 66 is determined by first setting its ending point to a certain point of time during an intake stroke, and then reckoning its starting point backward from the ending point. Referring to the diagram of FIG. 4 in which the axis of abscissa represents time, there are shown various strokes for each cylinder. At a predetermined point of time during the intake stroke, the ending point of the fuel injection period, that is, a valve-closing time T1 for the fuel injector 66, is determined in accordance with the amount of intake air introduced into the combustion chamber 30. The intake air amount, which is the amount of air supplied to chamber 30 during the preceding cycle, is detected by means of a sensor (not shown). The amount of the fuel to be injected, that is, injection quantity, is calculated from the intake air amount. Based on this injection quantity, the starting point of the fuel injection period, that is, a valve-opening time T2 of the fuel injector 66, is reckoned backward from the valve-closing time T1. Thus, if the fuel injection period is determined in this manner, the starting point of the injection period, that is, the valve-opening time T2 of the fuel injector 66, may sometimes be determined in the initial stage of or before the intake stroke, as shown by the soled or broken line of FIG. 4. Nevertheless, the injection period never fails to end during the intake stroke.

As mentioned before, the straight regions of the internal passages 44 of the guide passages 40 and 42 are inclined at the predetermined tilt angle $\alpha$ to the horizontal plane Y, and the intake ports 36 and 38 are arranged symmetrically with respect to the plane which extends at right angles to the vertical plane X and contains the axis of the cylinder bore 24. As the piston 26 descends, therefore, most of the air and the air-fuel mixture introduced or sucked through the intake ports 36 and 38 into the combustion chamber 30 are guided by the inner wall of the cylinder bore 24, thus forming swirl flows Fa and Fm. These swirl flows Fa and Fm run along the axis of the cylinder bore 24 to form so-called barrel swirl flows which are separated in layers from each other, in to the ridge direction of the pentroof 34. Thus, in the internal combustion engine 20 of the present invention, the air and the air-fuel mixture can be simultaneously introduced through the two intake ports 36 and 38 into each combustion chamber 30 during the intake stroke, so that the volumetric efficiency of the engine 20 can be improved for the overall operation region.

In the conventional internal combustion engine having the two intake ports, the swirl control valve is provided in the branch passage which connects with one of the intake ports, in order to produce a swirl flow of air in the combustion chamber, and the mechanism for driving the swirl control valve is additionally required. The internal combustion engine of the present invention does not, however, require the use of the swirl control valve and the drive mechanism therefor, so that its construction is simpler than that of the conventional engine. Thus, according to the invention, the potent barrel swirl flows Fa and Fm can be produced in the combustion chamber 30 of each cylinder by means of the simple mechanism, so that the combustion of lean air-fuel mixture can be satisfactorily performed.

Figure 6:
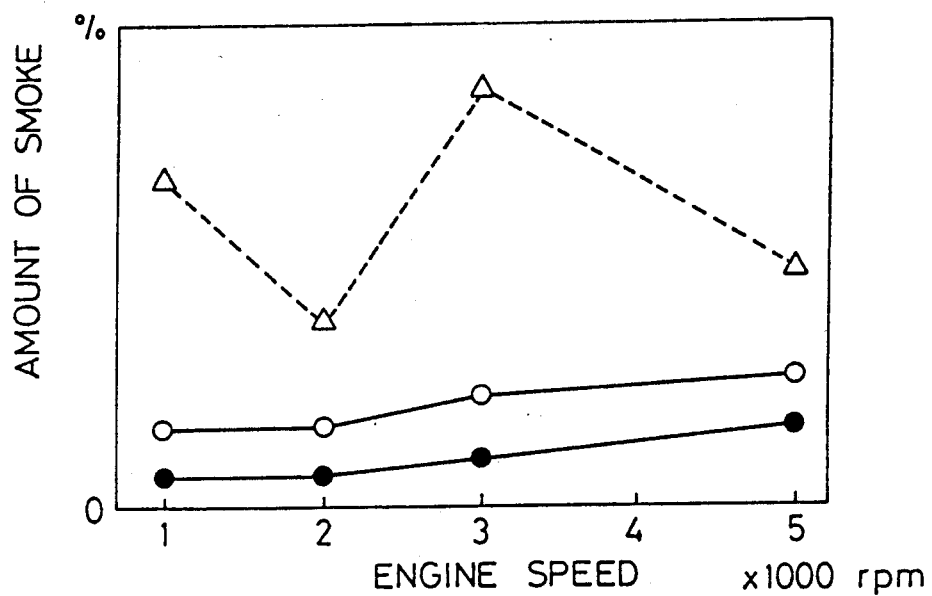
FIGS. 6 and 7 are diagrams showing the amounts of smoke in exhaust gas, based on comparison between the internal combustion engine according to the present invention and a prior art internal combustion engine.
Figure 7:
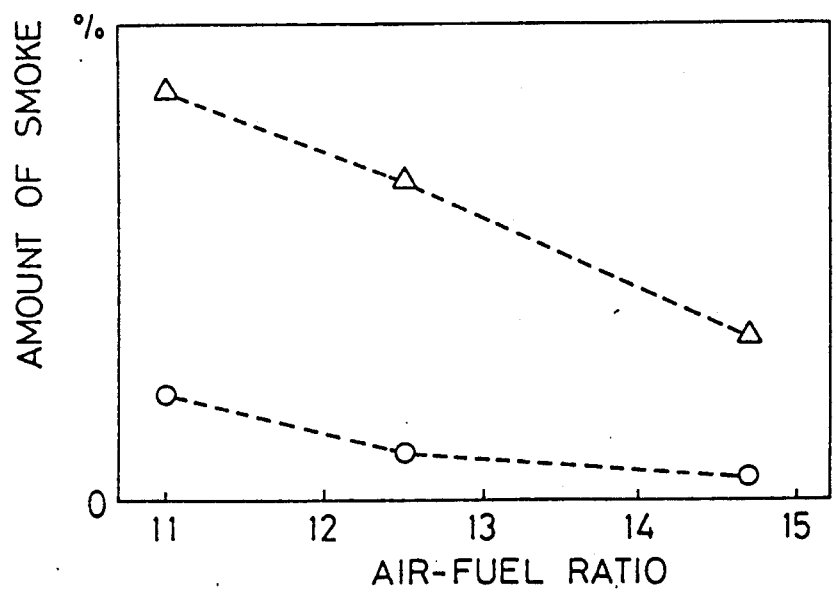

In the case of the internal combustion engine according to the present invention, moreover, the air-fuel mixture is supplied to the combustion chamber 30 only through the one intake port 38 of each cylinder, so that the fuel injector 66 for producing the air-fuel mixture should only be disposed only in the guide passage 42 which connects with the intake port 38. Accordingly, the fuel injector 66 can be arranged in the aforesaid manner, and therefore, the combustion efficiency of the fuel in the combustion chamber 30 can be improved. More specifically, the injection nozzle 68 of the fuel injector 66 can be situated within the straight region of the internal passage 44 of the guide passage 42, so that the amount of the injected fuel which adheres to the inner wall of the internal passage 44 can be minimized by properly setting the injection angle $\beta$ of the fuel from the injection nozzle 68. Accordingly, the fuel adhering to the inner wall of the internal passage 44 can be prevented from forming large-sized fuel drops, which may otherwise be supplied to the combustion chamber 30 during the subsequent intake stroke. Thus, the hydrocarbon (HC) content of exhaust gas can be considerably reduced to lessen smoke produced in the exhaust gas. Referring to FIGS. 6 and 7, there are shown experimental results based on comparison between the conventional internal combustion engine and the engine according to the invention. The conventional engine has two intake ports and the fuel is injected through one intake port. In the engine according to the invention, the shape of internal passage 44, the construction and arrangement of injector 66, and the fuel injection period are contrived as described above. In the case of FIG. 6, the axes of abscissa and ordinate represent the engine speed and the amount of smoke in the exhaust gas, respectively. In FIG. 6, the characteristic curve plotted by triangles indicates the case of the conventional internal combustion engine, while the characteristic curves plotted by circles and black spots indicate the case of the internal combustion engine of the invention. Also, the characteristic curves plotted by the circles and triangles indicate comparative examples using the same air-fuel ratio, while the characteristic curves plotted by the black spots indicates an experimental result obtained with use of a higher air-fuel ratio. FIG. 7 shows results of comparison or characteristic curves plotted by circles and triangles. In FIG. 7, the axes of abscissa and ordinate represent the air-fuel ratio and the amount of smoke.

According to the internal combustion engine of the present invention, the amount of smoke in its exhaust gas is reduced, as seen from the experimental results shown in FIGS. 6 and 7.

If the air-fuel mixture is supplied to the combustion chamber 30 only through the guide passage 42, then a jet of the fuel from each fuel injector need not be distributed to the guide passages 40 and 42. Accordingly, the independent portions of the guide passages 40 and 42, that is, the straight regions of the internal passages 44 of the passages 40 and 42, can be made long enough. Thus, the air and the air-fuel mixture introduced through the intake ports 36 and 38 into the combustion chamber 30 form stratified flows as they flow through the straight portion of each internal passage 44. This phenomenon is favorable for the production of the barrel swirl flows Fa and Fm and the improvement of the volumetric efficiency of the internal combustion engine 20.

As mentioned before, the air and the air-fuel mixture supplied to the combustion chamber 30 during the intake stroke are compressed as the piston ascends during a compression stroke which follows the intake stroke. Then, the air-fuel mixture is ignited by the ignition plug 70, whereby an explosion stroke is effected. Since the ignition plug 70 is situated close to the intake port 38 through which the air-fuel mixture is introduced, the air-fuel mixture can be securely ignited. In the combustion chamber 30, moreover, the barrel swirl flows Fa and Fm of the air and the air-fuel mixture are separated in layers from each other, as mentioned before, so that the air-fuel mixture can be burned with stability. In the final stage of the explosion stroke, furthermore, the air-fuel mixture or the so-called end gas in the vicinity of a piston head, which is situated far distant from the intake ports 36 and 38, is extremely lean, so that the internal combustion engine can be restrained from knocking.

Even if the air-fuel ratio of the air-fuel mixture supplied through the intake port 38 to the combustion chamber 30 is made lower than theoretical air-fuel ratio, that is, if the air-fuel mixture is rendered rich, the total air-fuel ratio of the air and the air-fuel mixture supplied to the chamber 30 can be made higher than the theoretical ratio, due to the existence of the air supplied through intake port 36 to the combustion chamber 30. In the case of the internal combustion engine 20 of the present invention, the air-fuel mixture can be stably burned even if it is lean so that its total air-fuel ratio is 20, for example. If combustion of such a lean air-fuel mixture is possible, the aforementioned knocking can be prevented more effectively, and also, the CO content of the exhaust gas can be reduced, and the fuel cost performance can be considerably improved.

Figure 8A:
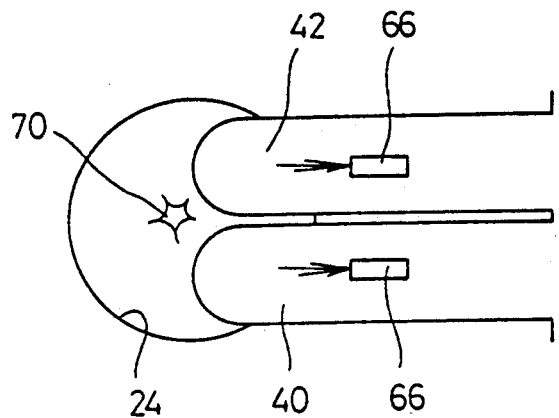
FIGS. 8A, 9A and 10A are schematic views individually showing arrangements of fuel injectors and ignition plugs of internal combustion engines.
Figure 9A:
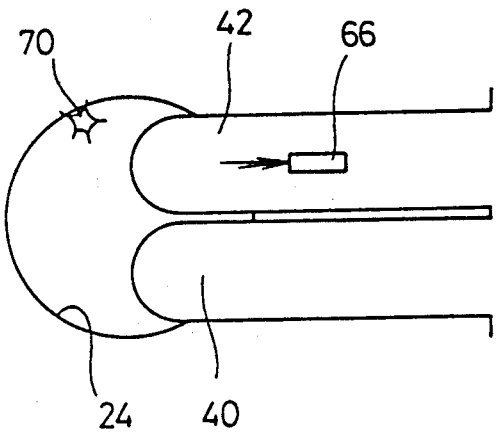
Figure 10A:
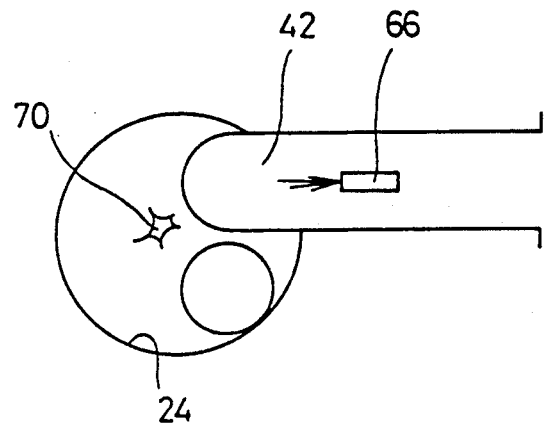

FIGS. 8A, 9A and 10A schematically show internal combustion engines which have the same construction except for the way of supplying the fuel into the combustion chamber and the position of the ignition plug. In the internal combustion engine shown in FIG. 8A, the fuel injector 66 is attached to each of the guide passages 40 and 42, and the two fuel injector are used to feed equal amounts of fuel into the guide passages. The ignition plug 70 is located in the center of the cylinder bore 24.

The engine shown in FIG. 9A is the internal combustion engine 20 according to the one embodiment described above. In the internal combustion engine shown in FIG. 10A, the one intake port 36 is closed, and the air-fuel mixture is introduced into the combustion chamber 30 through the guide passage 42 and the other intake port 38. In this case, moreover, the ignition plug 70 is located in the center of the cylinder bore 24, as in the case of FIG. 8A.

Figure 8B:
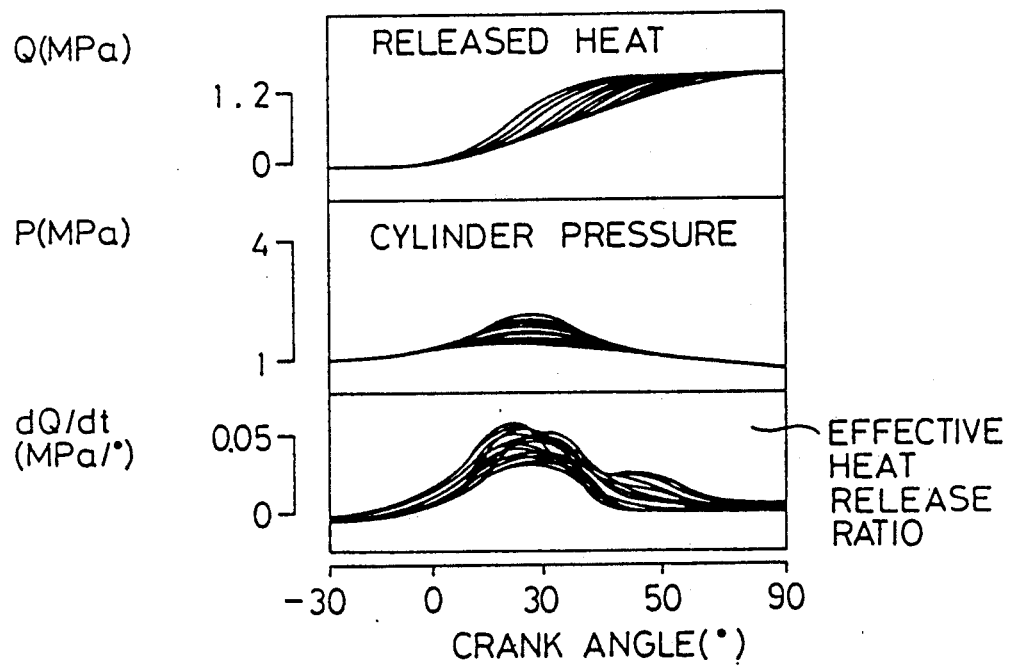
FIGS. 8B, 9B and 10B are graphs showing changes of the released heat, cylinder pressure, and specific heat release ratio of the internal combustion engines shown in FIGS. 8A, 9A and 10A, respectively.
Figure 9B:
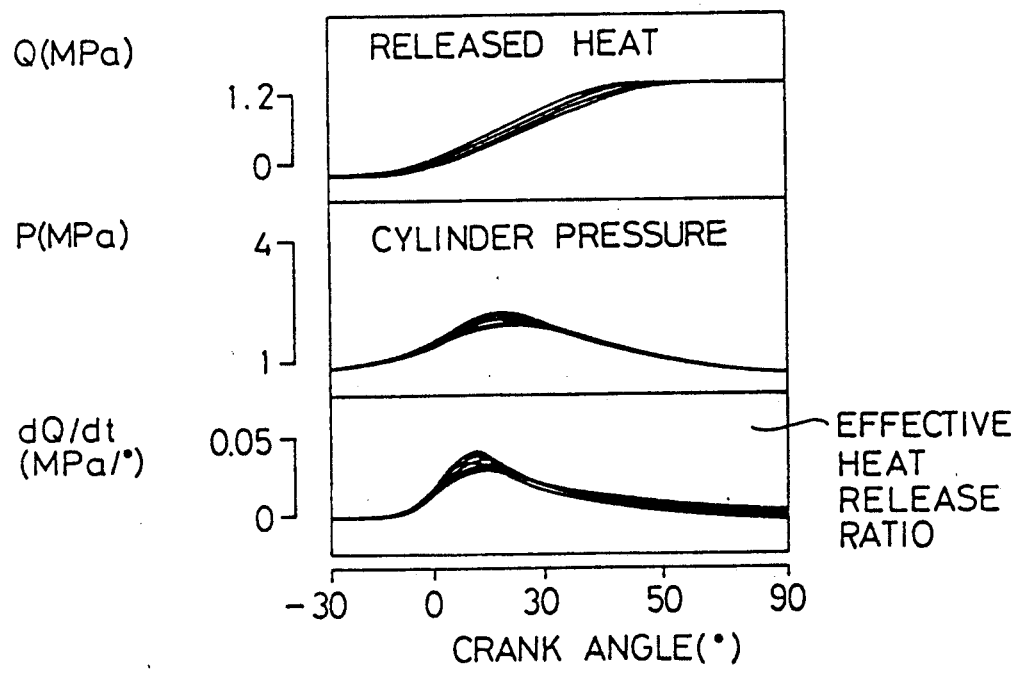
Figure 10B:
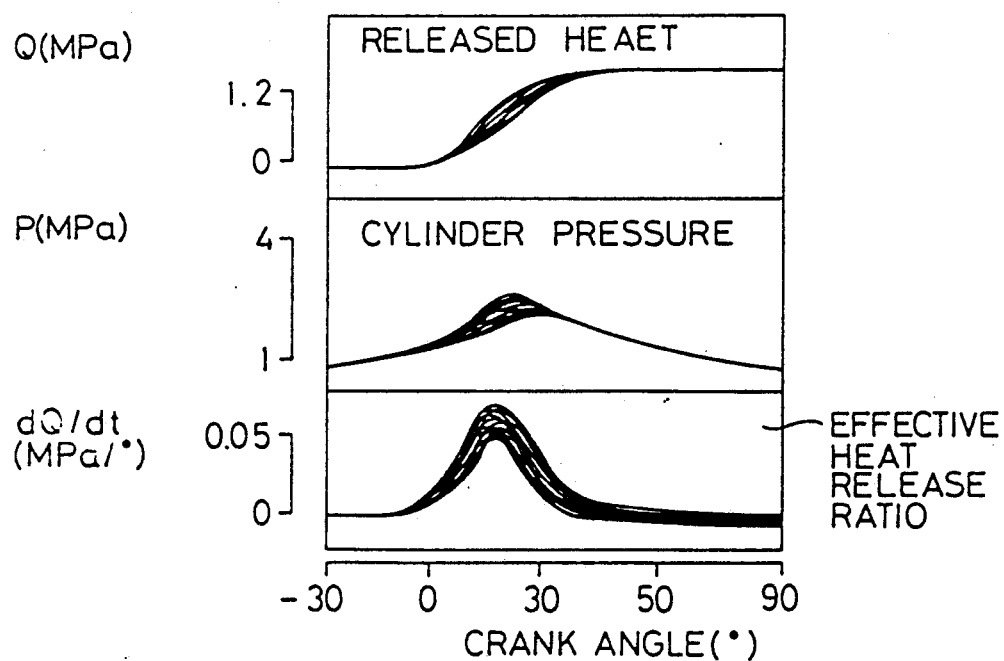

The internal combustion engines of FIGS. 8A, 9A and 10A are operated under the same operating conditions (wide-open-throttle operation with engine speed of 1,000 rpm and total air-fuel ratio of 20). FIGS. 8B, 9B and 10B show cyclic changes of the released heat Q, cylinder pressure P, and effective heat release ratio dQ/dt of the individual internal combustion engines.

As seen from FIGS. 8B, 9B and 10B for comparative examination, the cyclic changes of the released heat Q, cylinder pressure P, and effective heat release ratio dQ/dt of FIG. 9, that is, those of the internal combustion engine 20 of the present invention, are the smallest.

The ignition plug 70 is preferably disposed in the manner shown in FIG. 1. Alternatively, however, the plug 70 may be located closer to the center of the cylinder bore 24. In this case, however, the closer to the center of the cylinder bore 24 the ignition plug 70 is located, the more the flow of the air-fuel mixture near the plug 70 will be disturbed by the air introduced through the intake port 36. It is to be noted, therefore, that the ignition and combustion of the air-fuel mixture are unstable in this case.

Figure 11A:
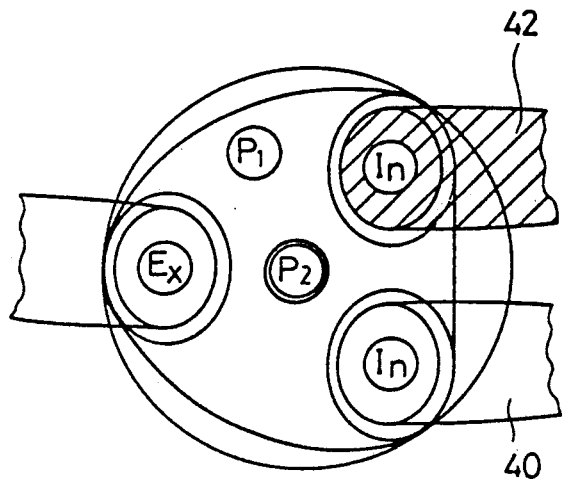
FIGS. 11A, 11B, 11C and 11D are diagrams showing arrangements of intake ports and ignition plugs in cylinders of different types.
Figure 11B:
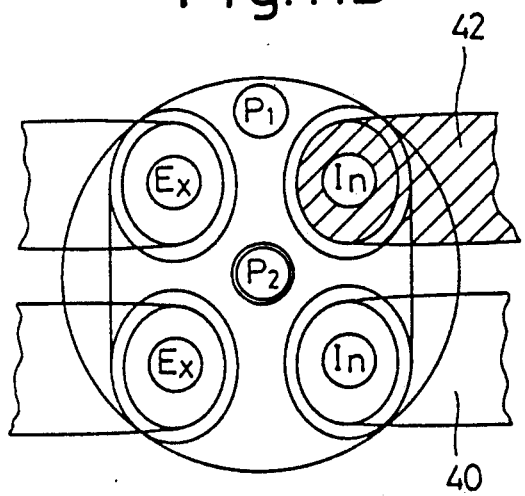
Figure 11C:
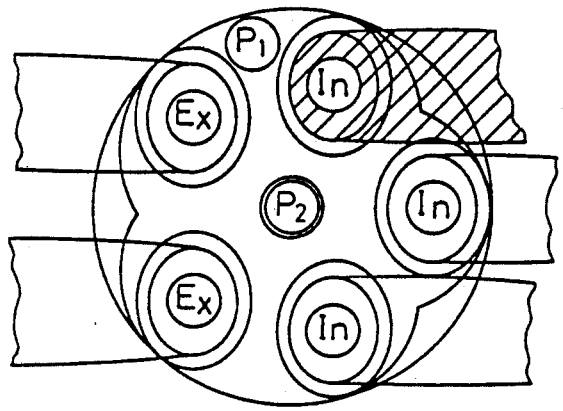

FIGS. 11A, 11B and 11C show arrangements of the intake ports, exhaust ports, and ignition plugs of the internal combustion engines according to the present invention. In these drawings, symbols In, Ex and P designate the intake ports, exhaust ports, and ignition plugs, respectively. Although the ignition plug is designated by two positions P1 and P2 in FIGS. 11A to 11C, it is most suitably situated in the position P1. The internal combustion engines of FIGS. 11A, 11B and 11C are the so-called three-valve, four-valve, and five-valve engines. The air-fuel mixture is supplied to the combustion chamber only through the hatched intake ports.

In the internal combustion engines of the present invention, the air-fuel mixture is supplied to the combustion chamber only through one of the intake ports. When the engine is operated with high load, however, this operating condition requires so large a fuel injection quantity that it is sometimes difficult to inject the required quantity of fuel from one fuel injector. Even if the required quantity of fuel can be injected from one fuel injector, the air-fuel mixture around the ignition plug sometimes becomes too rich to be ignited by means of the plug. In such an operation region of the internal combustion engine which requires a large injection quantity, the aforementioned drawbacks can be eliminated by supplying air-fuel mixtures to the combustion chamber through all the intake ports.

Figure 12A:
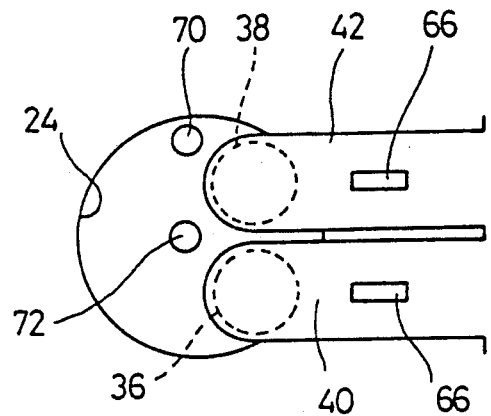
FIG. 12A is a diagram showing an arrangement of fuel injectors and ignition plugs in one cylinder of an internal combustion engine according to another embodiment of the present invention.
Figure 12B:
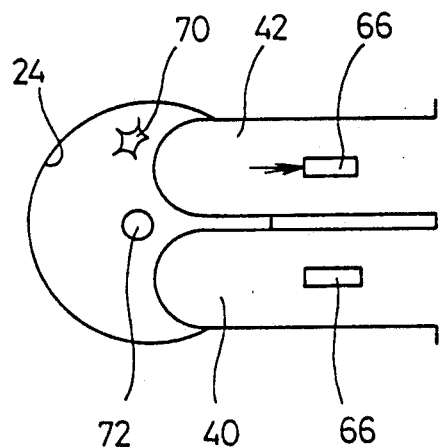
FIGS. 12B and 12C are diagrams showing operating states of the fuel injectors and the ignition plugs in the cylinder of FIG. 12A, in low- and high-load operations, respectively.
Figure 12C:
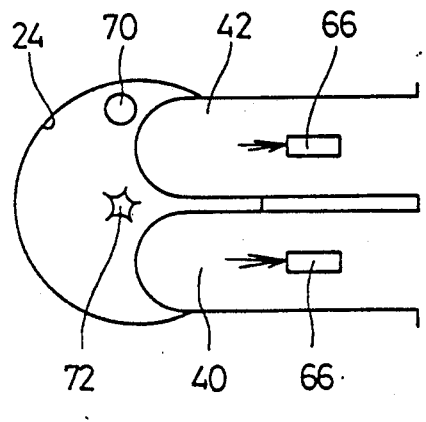

FIGS. 12A, 12B and 12C show specific means for eliminating the drawbacks. In the internal combustion engine shown in FIG. 12A, the fuel injector 66 is disposed in each of the guide passages 40 and 42, and another ignition plug 72 is provided besides the ignition plug 70. The plug 72 is situated close to the center of the cylinder bore 24, that is, in the vicinity of the intake port 36.

When the internal combustion engine of FIG. 12A is operated with low load, the fuel is injected only through the fuel injector 66 of the guide passage 42, as shown in FIG. 12B. In this case, therefore, the air-fuel mixture is supplied to the combustion chamber 30 only through the intake port 38 in the same manner as aforesaid, and is ignited by means of the ignition plug 70. In doing this, the ignition plug 72 is kept nonoperating.

Figure 11D:
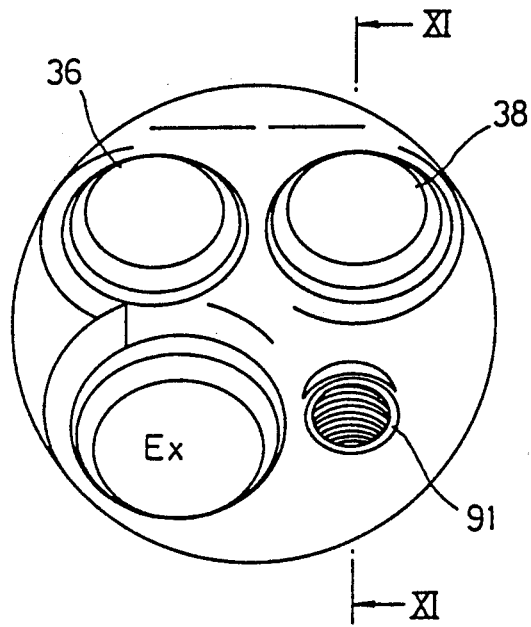
Figure 11E:
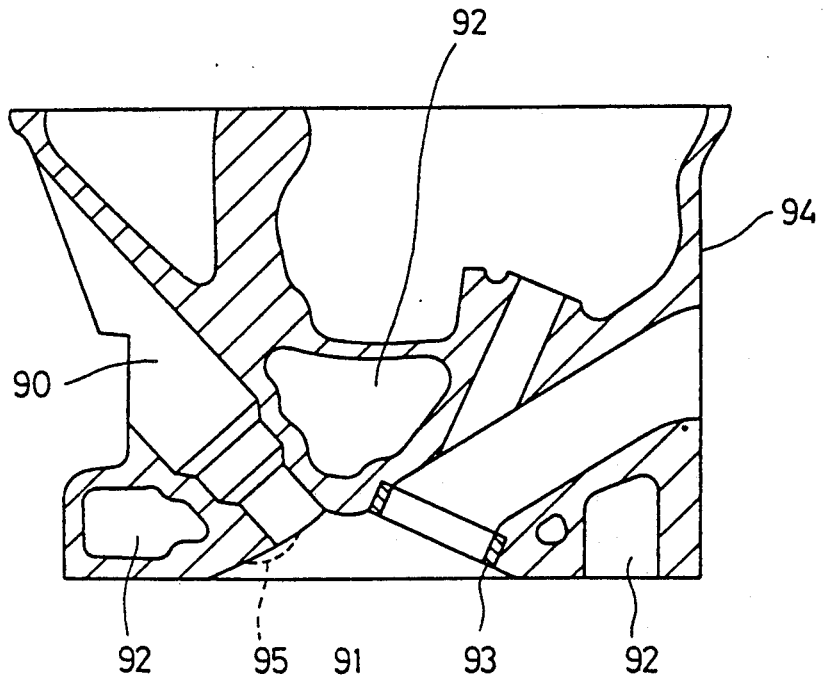
FIG. 11E is a sectional view taken along line XI—XI of FIG. 11D.

Further, FIG. 11D shows an another three-valve engine. In the engine of FIG. 11D, a fitting hole 90 and an exhaust port Ex are formed in the other slope of the pentroof, respectively. The fitting hole 90 and the intake port 38 through which the air-fuel mixture is supplied into the combustion chamber are located at both sides of the ridge of pentroof and faced to each other. The exhaust port Ex is faced to the intake port 36. The other slope, in which the opening 91 of fitting hole 91 is opened, is formed more flat than that of prior art shown by a broken line 95. Thus, the production of the barrel swirl flow is more promoted. In FIG. 11E, reference numerals 92, 93 and 94 denote a water jacket, a valve seat and a cylinder head, respectively.

When the engine of FIG. 12A is operated with high load, on the other hand, the fuel is injected from both the fuel injector 66, as shown in FIG. 12C, so that the air-fuel mixtures are supplied to the combustion chamber 30 through both the intake ports 36 and 38. In this case, moreover, the ignition plug 72, not the ignition plug 70, is used to ignite the air-fuel mixtures. Thus, by providing the fuel injectors for the individual guide passages and selectively using the two ignition plugs 70 and 72, the required fuel injection quantity can be secured despite the high-load operation of the engine. Moreover, the air-fuel mixtures supplied through the individual intake ports to the combustion chamber cannot become too rich to be ignited by means of the ignition plug 72.

In this case, moreover, the air-fuel mixtures can be supplied to the combustion chamber 30 through both the intake ports 36 and 38, the air-fuel ratios of these mixtures can be set independently. When the internal combustion engine is operated with high load, for example, a rich air-fuel mixture with the air-fuel ratio of 12 to 13 and a lean air-fuel mixture with the air-fuel ratio of 17 to 20 may be supplied to the combustion chamber through the intake ports 38 and 36, respectively. Even when the engine is operated with low load, moreover, the air-fuel mixture can be supplied, as required, to the combustion chamber also through the intake port 36. In this case, the respective air-fuel ratios of the air-fuel mixtures supplied through the intake ports 36 and 38 to the combustion chamber are different.

Also in the cases of the above embodiments shown in FIGS. 11A to 11C, the air-fuel mixtures can be supplied to the combustion chamber through all the intake ports when the internal combustion engine is operated with high load. In this case, the air-fuel mixtures may be ignited by alternatively using the ignition plug in the position P2.

In the case of the internal combustion engine shown in FIG. 8A, both the ignition plugs 70 and 72 may be used without regard to the load condition of the engine operation. In this case, a lean air-fuel mixture, as a whole, can be burned with higher stability.

Figure 13A:
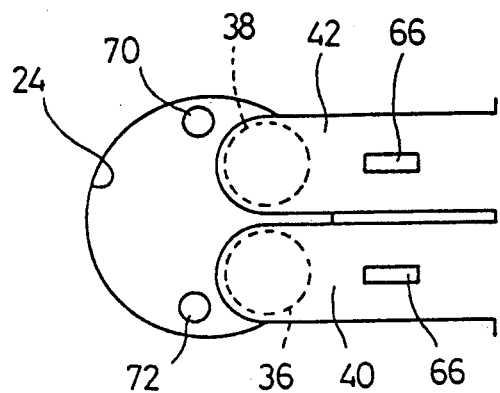
FIG. 13A is a diagram showing an arrangement of fuel injectors and ignition plugs in one cylinder of an internal combustion engine according to still another embodiment of the present invention.
Figure 13B:
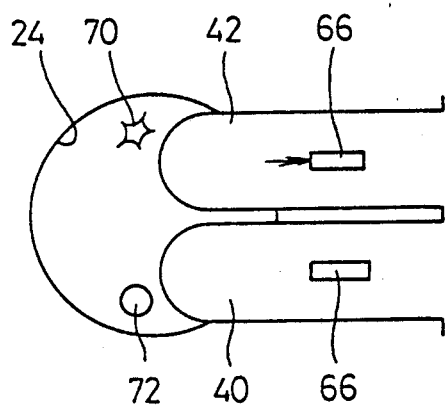
FIGS. 13B and 13C are diagrams showing operating states of the fuel injectors and the ignition plugs in the cylinder of FIG. 13A, in low- and high-load operations, respectively.

If the two ignition plugs are used in the internal combustion engines according to the present invention, as described above, the plug 72 may be situated in the position shown in FIG. 13A instead of the position shown in FIG. 12A. In this case, the ignition plugs 70 and 72 are located symmetrically with respect to the center of the cylinder bore 24. In the internal combustion engine shown in FIG. 13A, the air-fuel mixture is supplied to the combustion chamber 30 only through intake port 38, as seen from FIG. 13B, when the engine is operated with low load. In this case, only the ignition plug 70 is used to ignite the mixture. When the internal combustion engine is operated with high load, on the other hand, the air-fuel mixtures are supplied to the combustion chamber 30 through both the intake ports 36 and 38, as seen from FIG. 13C. In this case, both the ignition plugs 70 and 72 are used to ignite the mixtures. If both the ignition plugs 70 and 72, arranged is this manner, are thus used, the maximum distance or time for flame propagation in the combustion chamber 30 can be shortened.

Figure 13C:
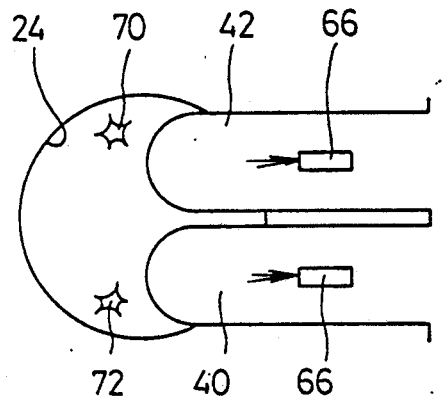
Figure 14:
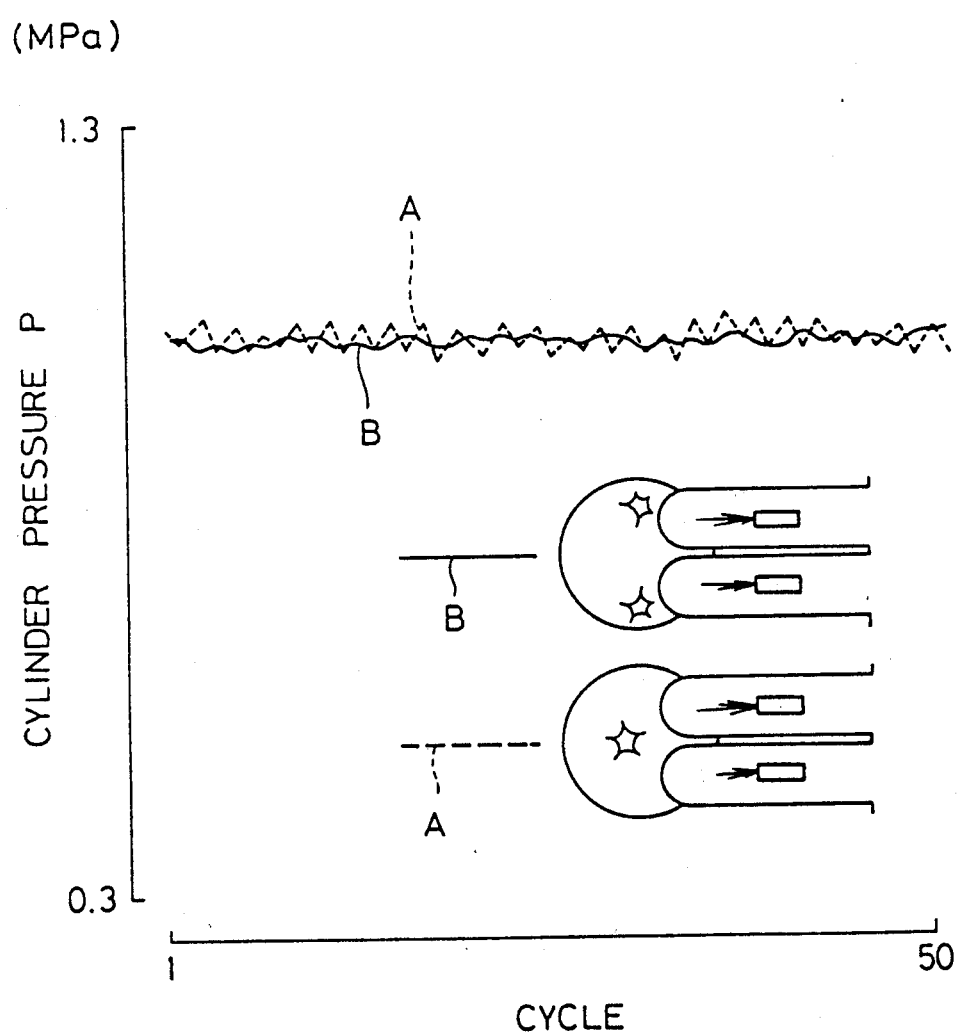
FIG. 14 is a diagram comparatively showing variations in cylinder pressure observed when the internal combustion engines of FIGS. 12A and 13A are operated in the states shown in FIGS. 12C and 13C.

Referring to FIG. 14, there are shown variations in combustion of the internal combustion engines shown in FIGS. 12C and 13C, that is, changes of pressure during the explosion stroke in the cylinders, observed when the engines are separately operated under the same high-load conditions (e.g., wide-open-throttle operation with engine speed of 500 rpm and total air-fuel ratio of 14.5) in the manners shown in FIGS. 12C and 13C. In FIG. 14, symbols A and B designate the cases of the internal combustion engines shown in FIGS. 12C and 13C, respectively. In the case of the engine of FIG. 13C, as seen from FIG. 14, the flame propagation time is shorter than in the case of the engine of FIG. 12C, so that the cylinder internal pressure varies only slightly. Thus, the combustion of the fuel in the combustion chamber 30 can be effected with stability.

Figure 15A:
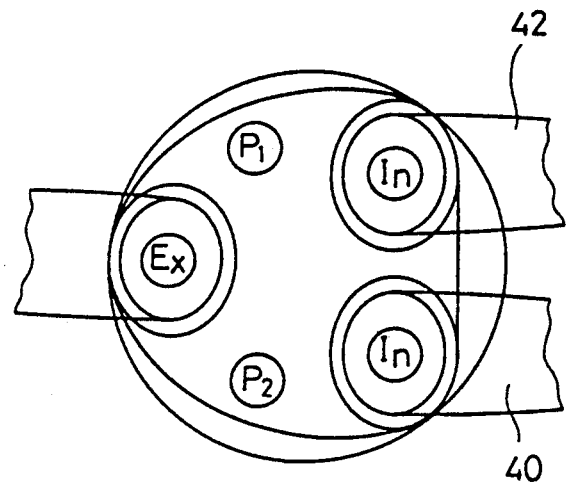
FIGS. 15A, 15B and 15C are diagrams showing different arrangements of ignition plugs in cylinders of different types, corresponding to FIGS. 11A, 11B and 11C, respectively.
Figure 15B:
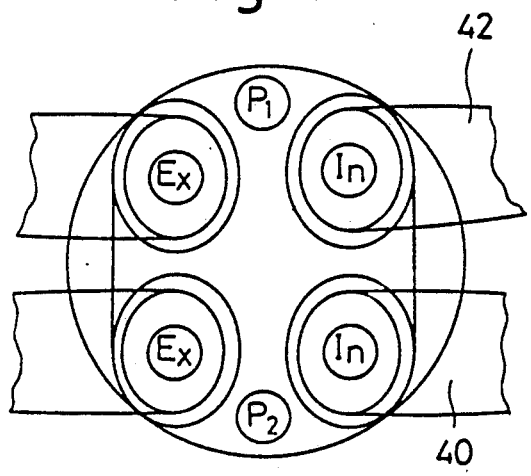
Figure 15C:
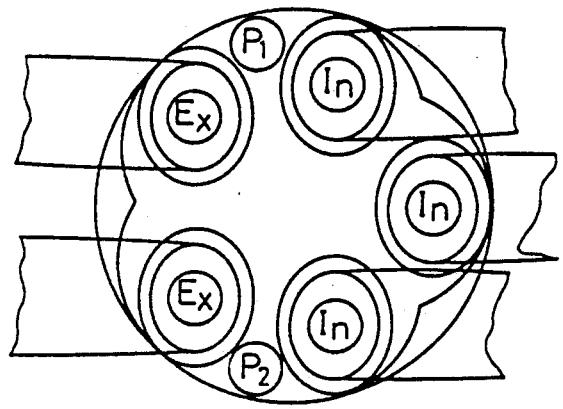

Referring to FIGS. 15A, 15B and 15C, there are shown internal combustion engines which correspond to the ones shown in FIGS. 11A, 11B and 11C, respectively. The difference between these two groups of engines lies in the positions P1 and P2 of their ignition plugs. In the internal combustion engines shown in FIGS. 15A to 15C, the air-fuel mixture is supplied to the combustion chamber through any of the intake ports when the engine is operated with high load. The positions P1 and P2 are set to the illustrated positions in order to shorten flame propagation distance or time. In the case of the three-valve internal combustion engine shown in FIG. 15A, the positions P1 and P2 of the ignition plugs are preferably situated on the axes of their corresponding guide passages, as viewed in the radial direction of the cylinder bore 24. In the cases of the four- and five-valve internal combustion engines shown in FIGS. 15B and 15C, however, the positions P1 and P2 of the ignition plugs cannot be set in the same manner as those of the three-valve engine, due to the limited mounting space for the plugs. Accordingly, in the cases of the internal combustion engines of the present invention shown in FIGS. 15B and 15C, the positions P1 and P2 of the ignition plugs are set as illustrated. Thus, the positions P1 and P2 are both situated between the adjacent intake and exhaust ports and in the vicinity of the peripheral edge of the cylinder bore 24.

In the internal combustion engine of FIG. 11C having three intake ports, the air-fuel mixture is supplied to the combustion chamber through one of the intake ports. When the engine is operated with high load, however, the air-fuel mixture may be supplied to the combustion chamber through at least one of the two other intake ports.

According to the stratified-combustion internal combustion engines of the present invention, moreover, the total air-fuel ratio of the air-fuel mixture supplied to the combustion chamber need not always be made higher than the theoretical air-fuel ratio. More specifically, also in the case of the invention, the total air-fuel ratio may be made equal to or lower than the theoretical air-fuel ratio, according to circumstances.

What is claimed is:

1. A stratified-combustion internal combustion engine connected with an intake passage, comprising:

cylinder means including a cylinder bore in which a piston having a head surface is fitted, a combustion chamber defined in the cylinder bore by the head surface of the piston, and at least two intake ports situated on one side of a cross-sectional region of the combustion chamber, with respect to a vertical plane containing the axis of the cylinder bore, and opening into the combustion chamber;

intake means for introducing air through the intake passage into the combustion chamber, said intake means including a plurality of guide passages each having one end connected to a corresponding one of the intake ports and another end connected to the intake passage, and a partition wall arranged between adjacent guide passages and extending from the one end to said another end of the guide passage to thereby form independent guide passages, whereby when air is introduced from the intake passage into the individual guide passages during an intake stroke in which the piston moves from a top dead center to a bottom dead center, the air in the guide passages is introduced separately through the corresponding intake ports into the combustion chamber;

swirl producing means for causing most of air introduced separately from the intake ports into the combustion chamber to produce air swirls flowing along the axis of the cylinder bore, the swirl producing means including a straight portion of each guide passage extending straight substantially from the one end to said another end thereof, projections of the respective axes of the straight portions on a horizontal plane, parallel to the cross-section of the combustion chamber, extending substantially at right angles to the vertical plane and substantially parallel to each other, tilt angle α between the axis of each straight portion and the horizontal plane being set such that the air introduced from each intake port into the combustion chamber during the intake stroke is directed to an inner wall portion of the cylinder bore located on the other side of the cross-sectional region of the combustion chamber, whereby as the piston moves, the air directed to the inner wall portion of the cylinder bore forms swirls flowing along the inner wall of the cylinder bore; and fuel injection means for producing an air-fuel mixture by injecting fuel into the air flowing through at least one of the guide passages.

2. A stratified-combustion internal combustion engine according to claim 1, further comprising an igniter for igniting an air-fuel mixture introduced into the combustion chamber, the igniter being located in the vicinity of the intake port from which the air-fuel mixture is supplied, and forward with respect to the direction of flow of the air-fuel mixture.

3. A stratified-combustion internal combustion engine according to claim 2, wherein said igniter is situated close to the inner wall of the cylinder bore far distant from the other intake port.

4. A stratified-combustion internal combustion engine according to claim 1, wherein said combustion chamber has a pentroof portion extending along the vertical plane, and said intake ports open in one slope of the pentroof portion.

5. A stratified-combustion internal combustion engine according to claim 2, wherein said fuel injection means includes a fuel injector having an injection nozzle at the tip end thereof, said injection nozzle being situated within the straight portion of the one guide passage so as to face the intake port.

6. A stratified-combustion internal combustion engine according to claim 5, wherein said injection nozzle of said fuel injector has a fuel injection angle such that a jet of the fuel can fully pass through the intake port.

7. A stratified-combustion internal combustion engine according to claim 6, wherein said fuel injection means further includes another fuel injector located in the straight portion of the other guide passage, said second fuel injector being adapted to be actuated at least when the internal combustion engine is operated with high load.

8. A stratified-combustion internal combustion engine according to claim 7, further comprising a second igniter located in the vicinity of the intake port connecting with the other guide passage, said second igniter being adapted to be actuated at least when the internal combustion engine is operated with high load.

9. A stratified-combustion internal combustion engine according to claim 8, wherein said second igniter is actuated in the overall operation region of the internal combustion engine.

10. A stratified-combustion internal combustion engine according to claim 9, wherein said second igniter is situated in the center of the cylinder bore.

11. A stratified-combustion internal combustion engine according to claim 9, wherein said second igniter is situated close to the inner peripheral wall of the cylinder bore.

12. A stratified-combustion internal combustion engine according to claim 1, wherein the amount of the fuel injected from the fuel injection means into the air in the guide passages is set so that the air-fuel ratio of the mixture of the air and the fuel supplied to the combustion chamber is higher than the theoretical air-fuel mixture.

13. A stratified-combustion internal combustion engine according to claim 1, wherein said straight portions each have a uniform circular cross-sectional area along an entire axial length thereof.

14. A stratified-combustion internal combustion engine connected with an intake passage, comprising:

cylinder means including a cylinder bore in which a piston having a head surface is fitted, a combustion chamber defined in the cylinder bore by the head surface of the piston, and at least two intake ports situated on one side of a cross-sectional region of the combustion chamber, with respect to a vertical plane containing the axis of the cylinder bore, and opening into the combustion chamber;

intake means for introducing air through the intake passage into the combustion chamber, said intake means including a plurality of guide passages each having one end connected to a corresponding one of the intake ports and another end connected to the intake passage, and a partition wall arranged between adjacent guide passages and extending from the one end to said another end of the guide passage to thereby form independent guide passages, whereby when air is introduced from the intake passage into the individual guide passages during an intake stroke in which the piston moves from a top dead center to a bottom dead center, the air in the guide passages is introduced separately through the corresponding intake ports into the combustion chamber;

swirl producing means for causing most of air introduced separately from the intake ports into the combustion chamber to produce air swirls flowing along the axis of the cylinder bore, the swirl producing means including a straight portion of each guide passage extending straight substantially from the one end to said another end thereof, projections of the respective axes of the straight portions on a horizontal plane, parallel to the cross-section of the combustion chamber, extending substantially at right angles to the vertical plane and substantially parallel to each other, a tilt angle $\alpha$ between the axis of each straight portion and the horizontal plane being set such that the air introduced from each intake port into the combustion chamber during the intake stroke is directed to an inner wall portion of the cylinder bore located on the other side of the cross-sectional region of the combustion chamber, whereby as the piston moves, the air directed to the inner wall portion of the cylinder bore forms swirls flowing along the inner wall of the cylinder bore;

fuel injection means for producing an air-fuel mixture by injecting fuel into the air flowing through at least one of the guide passages; and an igniter which, when an air-fuel mixture in the combustion chamber is compressed as the piston moves from the bottom dead center to the top dead center during a compression stroke of the engine subsequent to the intake stroke, ignites the air-fuel mixture and thereby starts an explosion stroke of the engine, the igniter being located in the vicinity of the intake port from which the air-fuel mixture is supplied, and forward with respect to the direction of flow of the air-fuel mixture.

15. A stratified-combustion internal combustion engine according to claim 14, wherein said cylinder means has two intake ports opening into the combustion chamber.

* * * * *